M. F. NEWMAN.
WATER PURIFYING APPARATUS.
APPLICATION FILED DEC. 31, 1908.
922,025.
Patented May 18, 1909.
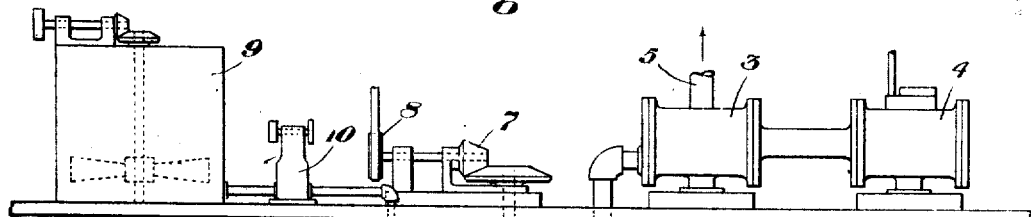
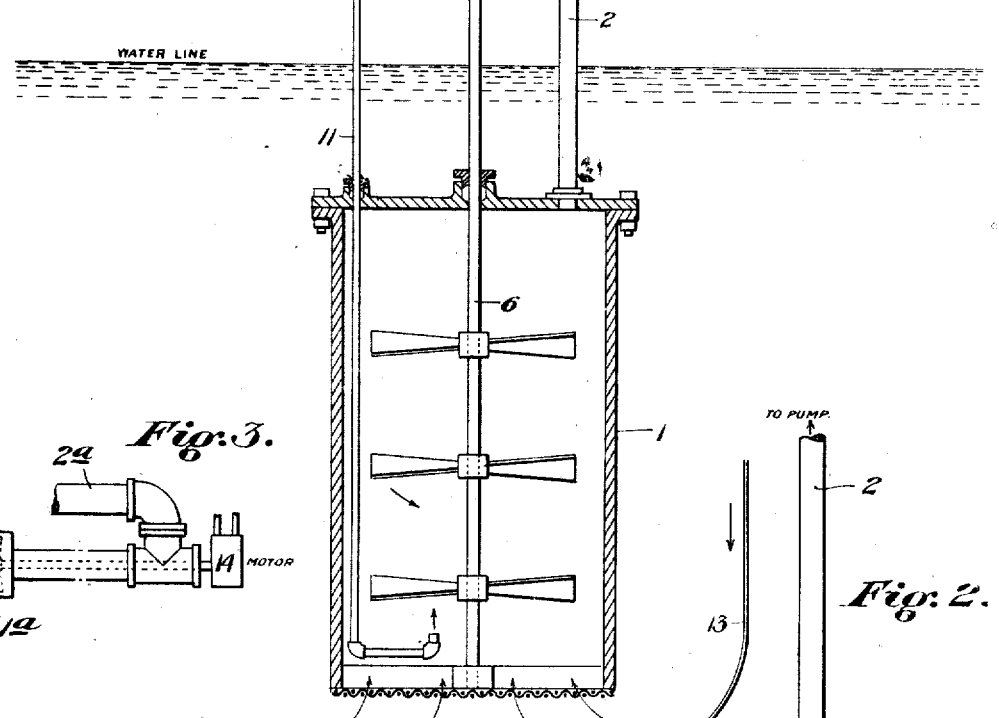
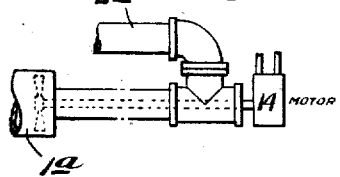
Witness:
Chas. S. Sipley.
Fred Staub.
Inventor,
Martin F. Newman
By F. W. H. Clay
his atty.

UNITED STATES PATENT OFFICE.

MARTIN F. NEWMAN, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

No. 922,025.   Specification of Letters Patent.   Patented May 18, 1909.

Application filed December 31, 1908. Serial No. 470,151.

*To all whom it may concern:*

Be it known that I, MARTIN F. NEWMAN, a citizen of the United States, residing at Pittsburg, in the State of Pennsylvania, have invented certain new and useful Improvements in Water-Purifying Apparatus, of which the following is a specification.

My invention relates particularly to the introduction of reagents for purifying water, and its primary objects are to render the impurities harmless before they reach any part of the water handling system or machinery, and to provide for feeding in the reagent in strict proportion to the amount of water actually used.

The invention is illustrated in two forms in the accompanying drawing, in which—

Figure 1 shows a diagram of the reagent feeding apparatus and pump, and a section of the submerged mixer in place in a large supply body of water. Fig. 2 indicates a modification of the intake for use in mines, and Fig. 3 is a modified detail of the latter.

Heretofore it has been customary to pump the raw water into specially designed conduits and tanks and there treat it to chemical reagents. Certain impurities in the water such as acids have a very deleterious effect upon the machinery and the pipes and tanks. I accomplish the objects above specified and other advantages by mixing the chemical directly into the intake from the water supply. Thus in Fig. 1, 1 show the device in a large body, as a river or mine sump or other reservoir; including a submerged intake chamber 1, which is preferably made of wood, and from this by means of pipe 2 and a suction pump 3 driven by engine 4, I discharge the water through pipe 5 to the apparatus for further purifying, or for immediate use if this further treatment is not necessary. The chamber 1 has an open-bottom and takes in the water freely, but it must pass through the stirring device 6 which is driven in any convenient manner, as by gears 7 and pulley 8, and in so doing it is mixed with the reagent. The reagent is introduced directly at the inlet of the chamber 1, as by being prepared in tank 9 and injected under pressure by pump 10 through pipe 11. Preferably the speed of the main pump and the chemical pump is in a fixed ratio.

In the modification of Fig. 2, I suppose the existence of mine galleries, which are too small to give room for the large intake chamber, and in such case I gain sufficient volume by a considerable length of large wooden suction pipe $2^a$ following the passages of the mine to the lower sump level, when it ends in an open-ended submerged intake $1^a$; the pump is supposed to be located at any convenient place as before. The form of this pipe alone causes intermixing of the chemical as the water is drawn through it, the chemical being here, as before, introduced directly at the intake, as by a small lead pipe 13 passing down through any course that is convenient, from a pump and mixer as before described.

In some cases a stirrer is required, and this may be arranged at the intake as shown in Fig. 3, where 14 represents a water motor to drive the stirring device.

It will be noted that in both forms of apparatus the chemical is introduced under pressure and thoroughly mixed with the water before it ever reaches any of the machinery, or in Fig. 1, antecedent even to the inlet pipe proper. In this also, any matter precipitated is automatically dumped out of the system at the intake and assists in the action on freshly introduced water. In both forms the mixer is partly automatic, inasmuch as no water can flow into the water pump without passing through a supply of the chemical reagent, and only so much water as is used, is treated to the chemical.

Having thus described my invention and illustrated its use, what I claim as new and desire to secure by Letters Patent, is the following:—

1. In water purifying apparatus, a reagent treatment device adapted to remove deleterious materials from the water at the intake from the supply before reaching any of the machinery, of the water handling system.

2. In water purifying apparatus, a reagent treatment vessel forming the intake from the supply to the system, substantially as described.

3. In water purifying apparatus, the combination with a water pump and a supply reservoir, of an open ended intake chamber in said reservoir and connected to the pump, and a chemical reagent inlet in the intake chamber.

4. A water supply intake made in the form of an open-ended vessel submerged in the supply, combined with means for introducing a reagent under pressure therein, and a stirring device therein, substantially as described.

5. In a water handling system, the combination with a water supply and a pump for drawing therefrom, of an open-ended intake vessel in the supply, having means to introduce and mix in chemical reagents with the water at its initial entrance to the system.

6. A water supply intake vessel having a stirring device, combined with means to introduce reagents directly to said intake and under pressure.

In testimony whereof I have hereunder signed my name in the presence of the two subscribed witnesses.

MARTIN F. NEWMAN.

Witnesses:
F. W. H. CLAY,
CHAS. S. LEPLEY.